United States Patent
Hattori

(10) Patent No.: US 9,086,833 B2
(45) Date of Patent: Jul. 21, 2015

(54) SYSTEM THAT OUTPUTS STATUS INFORMATION REPRESENTING A STATUS OF A DEVICE

(71) Applicant: CANON KABUSHIKI KAISHA, Tokyo (JP)

(72) Inventor: Yusuke Hattori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/245,647

(22) Filed: Apr. 4, 2014

(65) Prior Publication Data
US 2014/0327930 A1    Nov. 6, 2014

(30) Foreign Application Priority Data
May 1, 2013    (JP) .................................. 2013-096648

(51) Int. Cl.
*G06F 3/12*    (2006.01)

(52) U.S. Cl.
CPC ............ *G06F 3/1294* (2013.01); *G06F 3/1285* (2013.01)

(58) Field of Classification Search
USPC ................................................ 358/1.1–3.29
See application file for complete search history.

(56) References Cited

U.S. PATENT DOCUMENTS

| | | | |
|---|---|---|---|
| 2007/0205858 A1* | 9/2007 | Choi | 340/3.1 |
| 2009/0040551 A1 | 2/2009 | Ohara | 358/1.15 |
| 2009/0132589 A1 | 5/2009 | Daos et al. | 707/104.1 |
| 2012/0081749 A1* | 4/2012 | Kitada | 358/1.15 |

FOREIGN PATENT DOCUMENTS

JP    2001-75754 A    3/2001

* cited by examiner

*Primary Examiner* — Marcellus Augustin
(74) *Attorney, Agent, or Firm* — Fitzpatrick, Cella, Harper & Scinto

(57) ABSTRACT

Status information representing the status of a device which performs predetermined processing is acquired from the device. The acquired status information is stored in a memory. The status information is output in response to input of a request to output the status information of the device. When the request is input after the lapse of the first time from the time corresponding to acquisition of the status information stored in the memory, status information is newly acquired from the device in accordance with the request, and the status information already stored in the memory before the input of the request is output.

30 Claims, 12 Drawing Sheets

F I G. 1
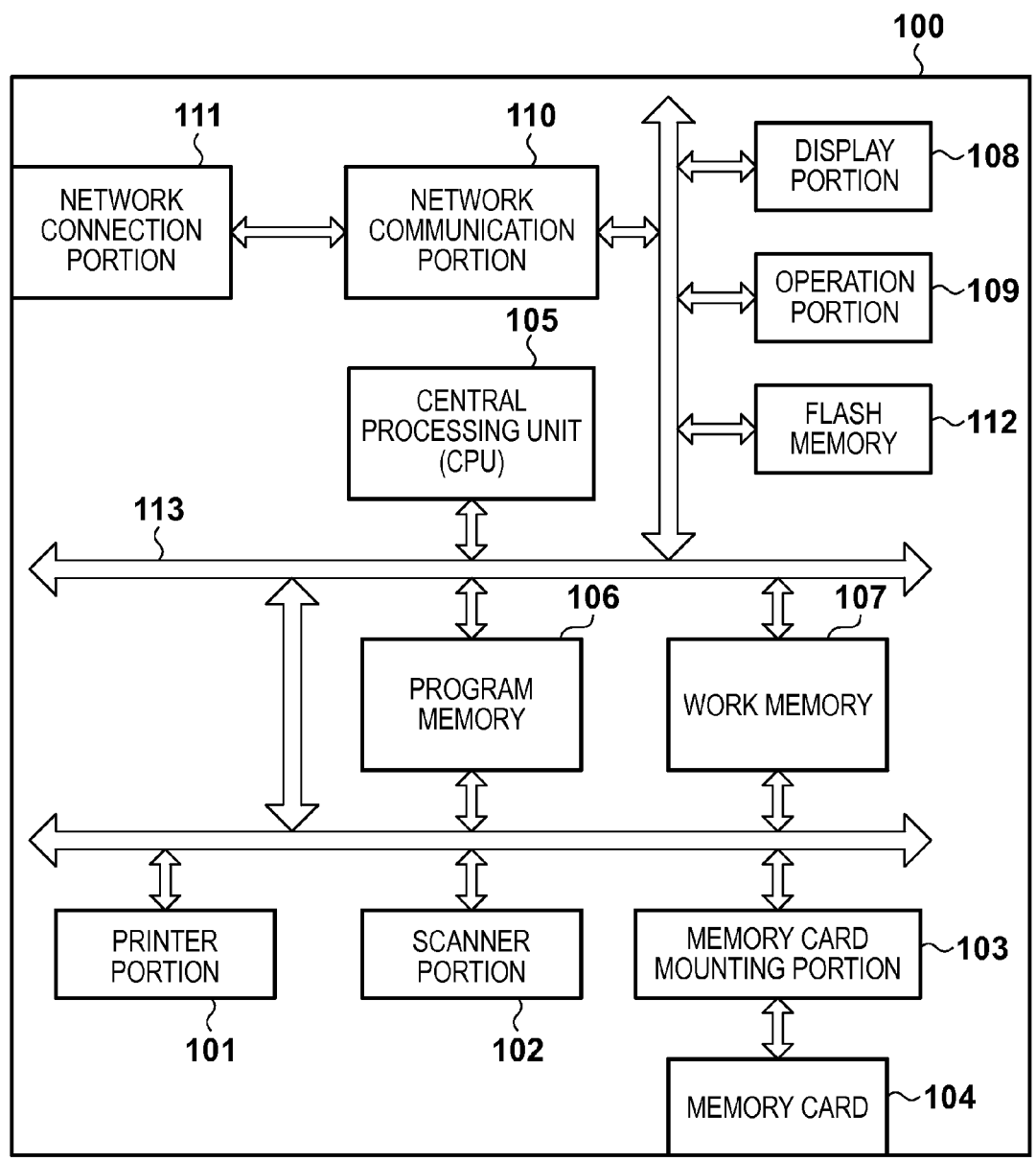

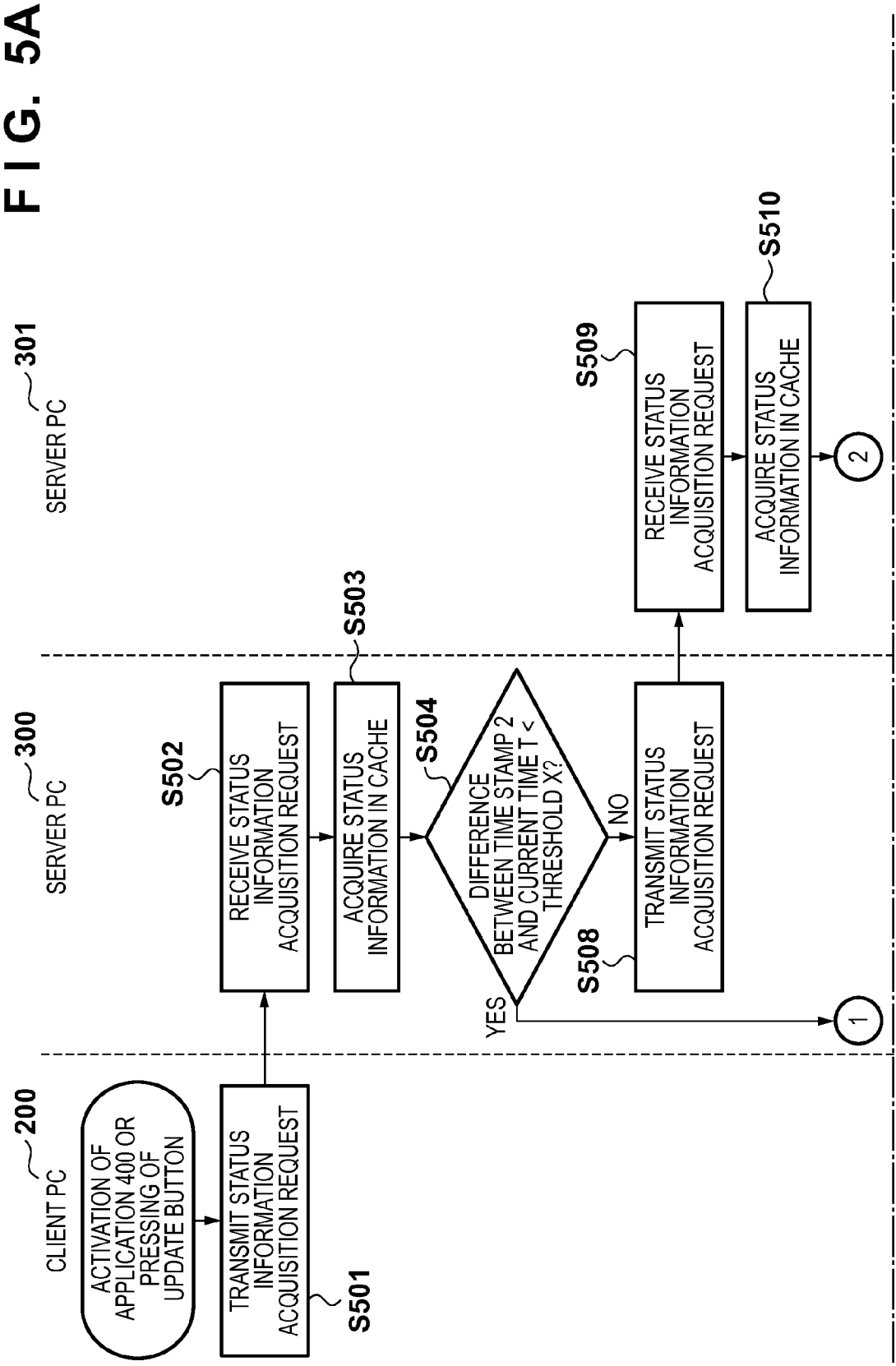

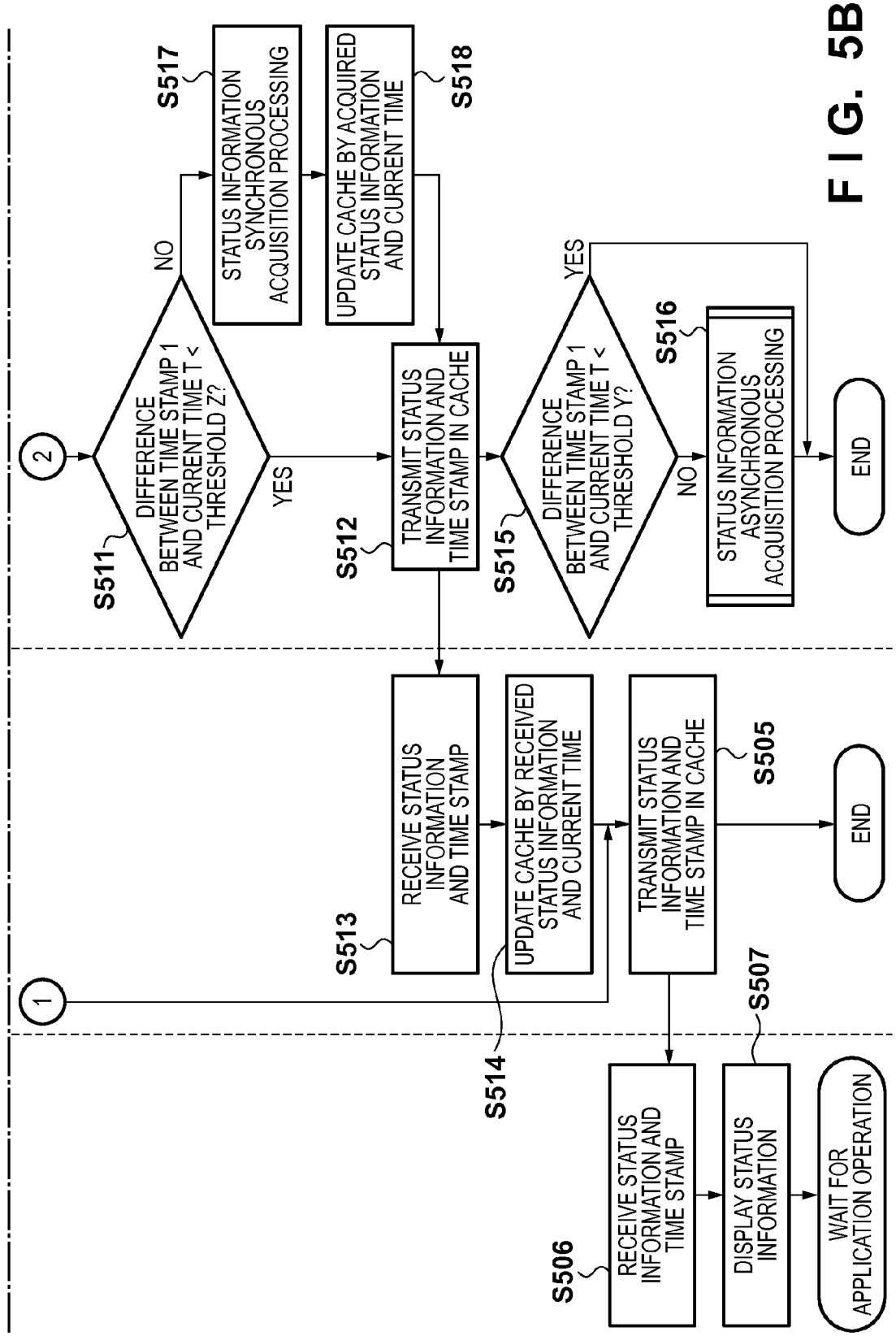

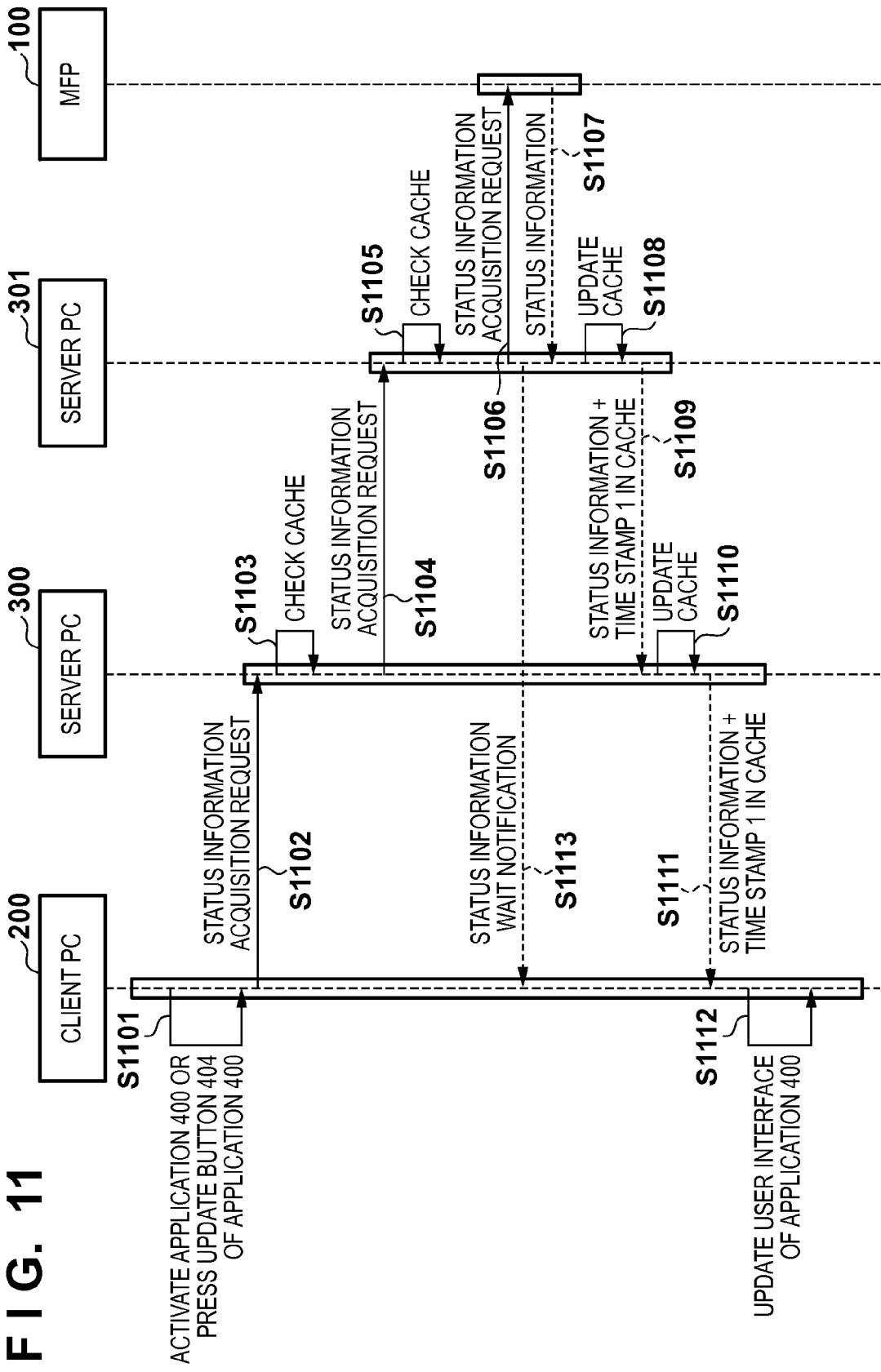

F I G. 12A

| PRINTER NAME | STATUS TYPE | STATUS EXPIRATION DATE (sec) (THRESHOLD X) |
|---|---|---|
| MFP100 | MAIN BODY INFORMATION | 20 |
| | INK INFORMATION | 30 |
| MFP150 | MAIN BODY INFORMATION | 15 |
| | INK INFORMATION | 50 |

F I G. 12B

| PRINTER NAME | STATUS TYPE | STATUS UPDATE SHORTEST INTERVAL (sec) (THRESHOLD Y) | CACHE EXPIRATION DATE (sec) (THRESHOLD Z) |
|---|---|---|---|
| MFP100 | MAIN BODY INFORMATION | 60 | 3600 |
| | INK INFORMATION | 120 | 3600 |
| MFP150 | MAIN BODY INFORMATION | 90 | 21600 |
| | INK INFORMATION | 180 | 21600 |

SYSTEM THAT OUTPUTS STATUS INFORMATION REPRESENTING A STATUS OF A DEVICE

BACKGROUND OF THE INVENTION

1. Field of the Invention

The present invention relates to an apparatus which outputs status information representing the status of a device, a system, and a method.

2. Description of the Related Art

Recently, the computer technology and network communication technology have made significant progress. For these technologies, a peripheral apparatus control system is effectively used in various scenes such as home and an office, in which a peripheral apparatus is connected to an information processing apparatus by using various interfaces such as a USB, Ethernet®, and wireless LAN. Examples of the peripheral apparatus are a printer, copying machine, facsimile apparatus, scanner, digital camera, and a multi-function peripheral of them.

There is a demand to acquire status information of a peripheral apparatus by an information processing terminal via an information processing server connected by a network.

Japanese Patent Laid-Open No. 2001-75754 discloses a method of acquiring status information of a printer by a server in a system in which the printer and server are connected. In this system, when the printer is printing, the server acquires status information cached in the server, and when the printer is not printing, directly inquires the status of the printer.

However, in the conventional technique, immediately after printing in the printer is completed, even if status information has not been updated after being acquired by the server, the server inquires the status of the printer. Then, the server acquires the same status information as one already stored in it. This communication is wasteful, resulting in poor efficiency.

SUMMARY OF THE INVENTION

The present invention provides an information processing technique capable of appropriately acquiring status information of a device.

An information processing apparatus according to the present invention comprises the following arrangement. That is, An apparatus comprising: an acquisition unit configured to acquire, from a device which performs predetermined processing, status information representing a status of the device; a storage control unit configured to store, in a memory, the status information acquired by the acquisition unit; and an outputting unit configured to output the status information in response to input of a request to output the status information of the device, wherein in a case where the request is input after an elapse of a first time from time corresponding to acquisition of the status information stored in the memory by the storage control unit, the acquisition unit newly acquires status information from the device in accordance with the request, and the outputting unit outputs the status information already stored in the memory before the input of the request.

According to the present invention, when the difference between the time corresponding to a request to output status information of a device, and the time when status information was stored in a memory is smaller than a predetermined threshold, the status information already stored in the memory is output. Therefore, status information of the device can be acquired appropriately.

Further features of the present invention will become apparent from the following description of exemplary embodiments with reference to the attached drawings.

BRIEF DESCRIPTION OF THE DRAWINGS

FIG. 1 is a block diagram showing the schematic arrangement of an MFP as an example of a peripheral apparatus in a typical embodiment of the present invention;

FIGS. 5A and 5B are flowcharts showing an operation of acquiring status information;

FIG. 11 is a sequence chart showing an example of the status acquisition processing; and FIGS. 12A and 12B are tables showing an example of a threshold table held in the server PC.

DESCRIPTION OF THE EMBODIMENTS

Figure 2:
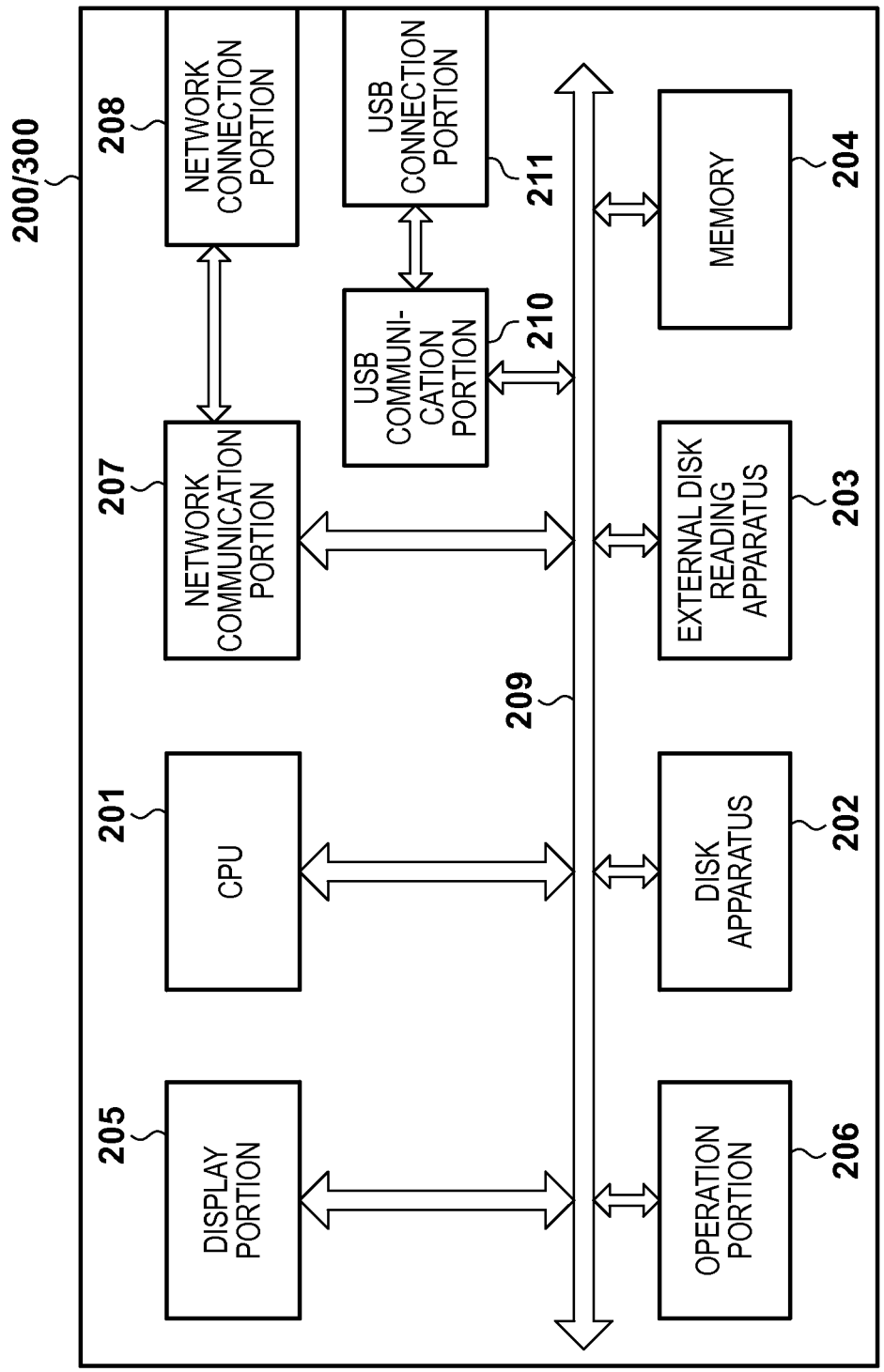
FIG. 2 is a block diagram showing the schematic arrangement of a client PC and a server PC serving as an example of an information processing apparatus in the typical embodiment of the present invention.

Embodiments of the present invention will now be described in detail with reference to the accompanying drawings. It is to be understood that the following embodiments are not intended to limit the claims of the present invention, and that not all combinations of features described in the following embodiments are indispensable for the means to solve the problems according to the present invention.

First, an MFP (Multi Function Peripheral) commonly used in the following embodiments, a PC serving as an information processing terminal connectable to the MFP, and a network configuration which connects them will be explained.

FIG. 1 is a block diagram showing the schematic arrangement of an MFP as an example of a peripheral apparatus in a typical embodiment of the present invention. An MFP 100 has a printer function, scanner function, and storage function as predetermined executable processes, and can provide the respective function services via a network.

In the MFP 100, a printer portion 101 implements the printer function, a scanner portion 102 implements the scanner function, and a memory card mounting portion 103 and memory card 104 implement the storage function. The printer portion 101 prints data such as externally received print data or image data stored in the memory card 104 on a printing medium such as printing paper by a printing method such as an inkjet method or electrophotographic method.

The scanner portion 102 optically scans an original set on an original table, converts it into electronic data, further converts the electronic data into a designated file format, and transmits the resultant data to an external apparatus via a network. The copy service implemented by the MFP 100 transfers, to the printer portion 101, image data generated by reading an original set on the original table by the scanner portion 102, and prints the image data on a printing medium by the printer portion 101. The MFP 100 allows an external apparatus connected via a network to read out a file stored in the memory card 104, edit it, and store it in the memory card.

The MFP 100 includes a central processing unit (CPU) 105 for controlling the respective building components of the MFP 100, and a program memory 106 such as a ROM which stores data such as program codes to be read out by the CPU 105. Further, the MFP 100 includes a work memory 107 such as a RAM for temporarily storing or buffering data such as image data in executing each service, a display portion 108 such as an LCD, and an operation portion 109 formed from respective switches.

The CPU 105 can implement various functions of the MFP 100 by reading out a program stored in the program memory 106 to the work memory 107, and executing it on the work memory 107. Note that the program may be executed by one processor or by a plurality of processors in cooperation. A circuit (hardware) for executing specific processing may be arranged to execute the specific processing.

Further, the MFP 100 includes a network communication portion 110 for connecting the MFP 100 to a network to perform various communications, and a network connection portion 111 for connecting the network communication portion 110 to a network medium. The network communication portion 110 copes with at least either of a wired LAN and wireless LAN. The wired LAN-compatible network connection portion 111 is a connector for connecting a wired LAN cable to the MFP 100. The wireless LAN-compatible network connection portion 111 is an antenna.

Further, the MFP 100 includes a flash memory 112 such as a nonvolatile flash memory for storing data received by the network communication portion 110.

A signal line 113 connects the respective building components of the MFP 100 to each other.

FIG. 2 is a block diagram showing the schematic arrangement of a client PC and a server PC serving as an example of an information processing apparatus in the typical embodiment of the present invention.

In FIG. 2, a CPU 201 controls the respective building components of a client PC 200/server PC 300. A disk apparatus 202 stores data such as application programs, an OS (Operating System), and various files to be read out by the CPU 201. An external disk reading apparatus 203 reads out the contents of an external storage medium such as a CD-ROM. If necessary, the CPU 201 performs processes such as temporal storage and buffering of data in a memory 204.

The CPU 201 reads out, to the memory 204, a program or OS stored in the disk apparatus 202, or a program read out from an external storage medium by the external disk reading apparatus. By executing the program in the memory 204, the CPU 201 can implement various functions of the client PC 200/server PC 300. Note that the program may be executed by one processor or by a plurality of processors in cooperation. A circuit (hardware) for executing specific processing may be arranged to execute the specific processing.

A display portion 205 is constructed by a display device such as an LCD, and an operation portion 206 is constructed by an input device such as a keyboard or mouse. A network communication portion 207 connects the client PC 200/server PC 300 to a network to perform various communications. A network connection portion 208 connects the network communication portion 207 to a network medium.

Although the client PC 200/server PC 300 includes the display portion 205 and operation portion 206 in the example of FIG. 2, the present invention is not limited to this. For example, a display device and operation device outside the client PC 200/server PC 300 may be connected to the client PC 200/server PC 300. In this case, the CPU 201 receives a user instruction in accordance with an operation to the external operation device, and controls the external display device to display various kinds of information.

Similar to the MFP 100, the network communication portion 207 and network connection portion 208 cope with at least either of a wired LAN and wireless LAN. As a concrete form of them, the network communication portion 207 and network connection portion 208 take a necessary function and form in accordance with a compatible LAN, similar to the network communication portion 110 and network connection portion 111 incorporated in the MFP 100. A signal line 209 connects the respective building components of the client PC 200/server PC 300 to each other. A USB communication portion 210 communicates with various peripheral apparatuses via a USB interface. A USB connection portion 211 is constructed by a USB connector.

Figure 3:
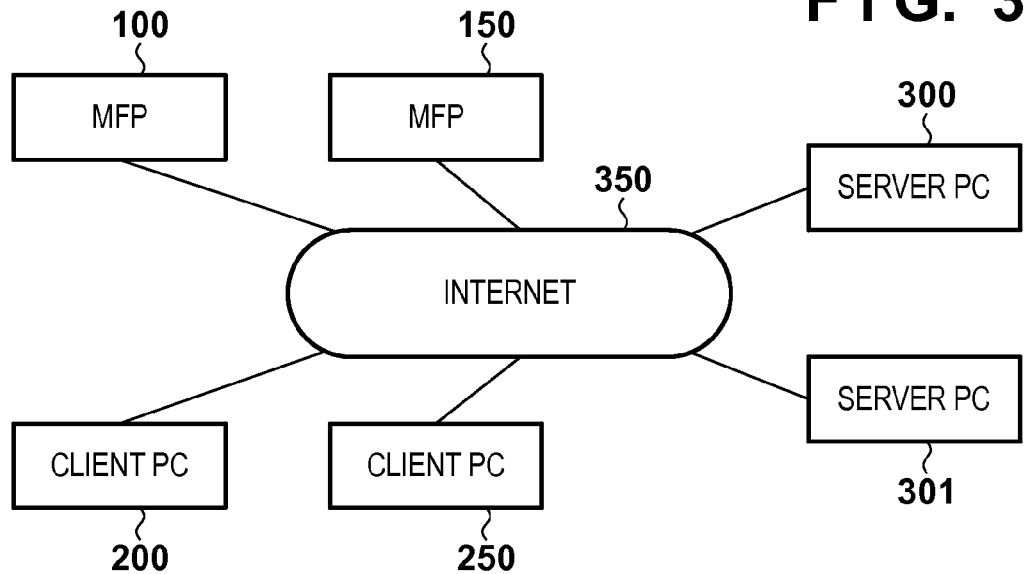
FIG. 3 is a block diagram showing the schematic arrangement of a network system including the MFP in FIG. 1 and the PC in FIG. 2.

FIG. 3 is a block diagram showing the schematic arrangement of a client-server network system (information processing system) including the MFP 100 in FIG. 1 and the client PC 200 and server PC 300 in FIG. 2.

In FIG. 3, an MFP 150 is an MFP having the same functions as those of the MFP 100. A client OS is installed in the client PC 200 and a client PC 250. The client PC 250 is a PC having the same arrangement as that of the client PC 200. A server OS is installed in the server PC 300 and a server PC 301. The server PC 301 is a PC having the same arrangement as that of the server PC 300. A network 350 connects the MFP 100, MFP 150, client PC 200, client PC 250, server PC 300, and server PC 301 to each other. The network 350 is constructed by various networks such as the Internet, intranet, WAN, and LAN.

The MFPs 100 and 150 communicate with the server PCs 300 and 301 via the network 350. The client PCs 200 and 250 communicate with the server PCs 300 and 301 via the network 350.

Note that the scheme of connection to the network 350 is arbitrarily a wired LAN or wireless LAN. The numbers of client PCs, server PCs, and MFPs connected to the network 350 are not limited to the example shown in FIG. 3, and may be less than two, or three or more.

Note that the MFPs 100 and 150 include the building components described with reference to FIG. 1. Similarly, the server PCs 300 and 301 include the building components described with reference to FIG. 2.

The server PCs 300 and 301 can cache status information of the MFPs 100 and 150. More specifically, status information is stored in the disk apparatus 202 together with time information (for example, time stamp) when the status information was acquired. The status information can be read out and transmitted to the outside via the network 350. Status information of the MFP 100 that is cached in the server PC 301 will be referred to as "cache status information 1", and status information of the MFP 100 that is cached in the server PC 300 will be referred to as "cache status information 2".

Further, the server PC 301 can acquire status information of the MFPs 100 and 150. The server PC 301 can transmit, to the server PC 300 via the network 350, the acquired status information or status information cached in the server PC 301. The server PC 300 can transmit, to the client PCs 200 and 250, status information received from the server PC 301 or status information cached in the server PC 300.

Figure 4:
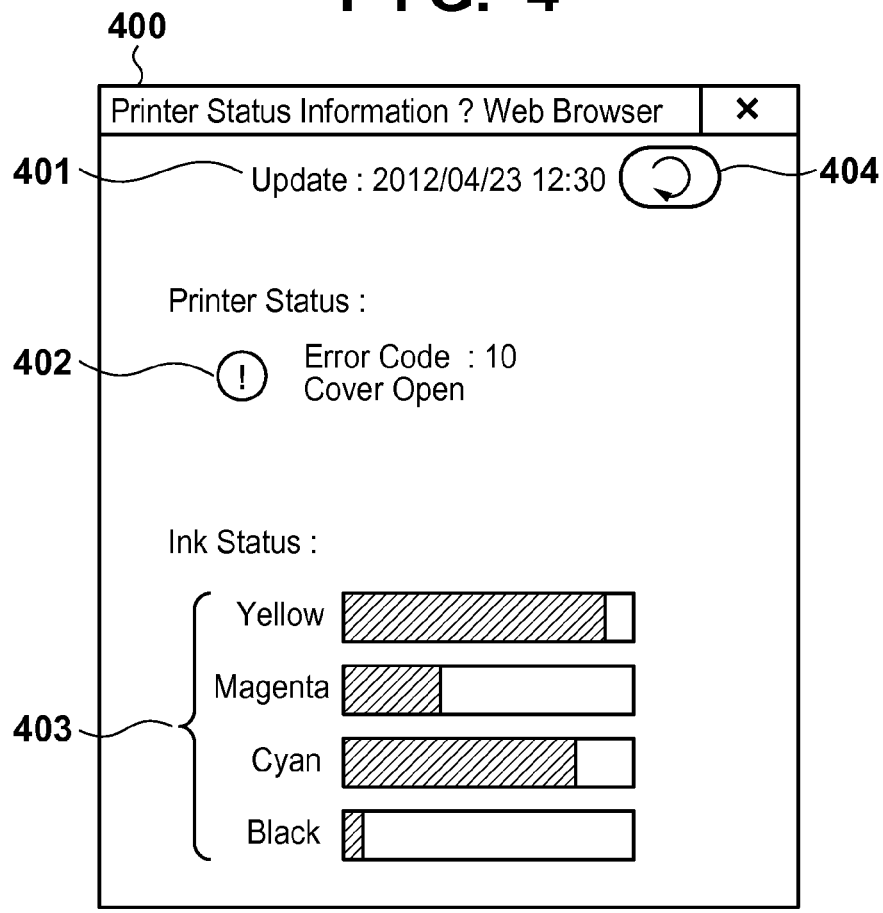
FIG. 4 is a view showing the screen of a client application that displays status information in the typical embodiment of the present invention.

FIG. 4 is a view showing the user interface of an application 400 serving as a client application capable of displaying status information of the MFP 100 or MFP 150 which uses a Web service. The client application is installed in the client PC.

More specifically, the disk apparatus 202 of the client PC 200 stores a program for displaying a screen shown in FIG. 4. The CPU 201 of the client PC 200 executes the program to display the screen shown in FIG. 4 on the display portion 205. When the network communication portion 207 acquires status information of the MFP 100 or MFP 150 via the server PC 300, the program displays a screen in accordance with the status information. The CPU 201 receives various instructions in accordance with user operations to the operation portion 206.

Reference numeral 401 denotes an acquisition date & time of displayed status information. Reference numeral 402 denotes a status of the MFP 100 or MFP 150 out of the acquired status information. Reference numeral 403 denotes information of ink mounted in the MFP 100 or MFP 150 out of the acquired status information. Reference numeral 404 denotes an update button of status information. When the user presses the update button 404, the CPU 201 of the client PC 200 transmits, to the server PC 300 via the network communication portion 207 and network connection portion 208, a command for acquiring the status of the MFP.

The server PC 300 executes status information acquisition processing for the MFP 100 or MFP 150, and sends back new status information to the client PC 200. The CPU 201 of the client PC 200 controls the application 400 to display, on the display portion 205, a screen reflecting the status information. In this arrangement, for example, the user refers to the acquisition date & time 401 of status information, and if he determines that the status information is old, presses the update button 404 to update the displayed status information by the application 400.

An embodiment to be implemented in the above-described network system will be explained.

The embodiment will explain an operation of acquiring status information of the MFP 100 from the client PC 200. In the embodiment, the server PC 300 controls the application, and the server PC 301 manages the MFP 100.

FIGS. 5A and 5B are flowcharts showing processing of acquiring status information of the MFP 100 via the server PCs 300 and 301 by the client PC 200 in the embodiment. Note that the flowchart shown in FIGS. 5A and 5B are implemented by executing a program by the CPU of each of the client PC 200, server PC 300, and server PC 301.

The user activates the application 400 or presses the update button 404 of the application 400 on the client PC 200. In response to this, the client PC 200 transmits a status information acquisition request to the server PC 300 to acquire status information of the MFP 100 (step S501).

The server PC 300 receives the status information acquisition request for the MFP 100 from the client PC 200, and inputs the request (step S502). The server PC 300 acquires status information (cache status information 2) of the MFP 100 that is cached in the disk apparatus 202 (step S503). In the disk apparatus 202 of the server PC 300, status information is cached for each MFP.

Further, the server PC 300 checks time stamp 2 accessory to cache status information 2 of the MFP 100 (step S503). By this check, the server PC 300 determines whether the acquisition of cache status information 2 of the MFP 100 has succeeded and whether the difference between time stamp 2 and current time T is smaller than a threshold X (step S504). That is, time stamp 2 and the current time T are compared. If the difference is smaller than the threshold X as a result of the comparison (YES in step S504), the server PC 300 transmits, as a response to the client PC 200, cache status information 2 and time stamp 2 serving as status information of the MFP 100 (step S505). If the difference is smaller than the threshold X, the server PC 300 regards the status information acquired in step S503 as sufficiently new one, and transmits the status information to the client PC 200. Thus, sufficiently new status information can be transmitted without inquiring the status of the server PC 301 or MFP 100.

Note that time stamp 2 is accessory to status information (cache status information 2) cached in the server PC 300. Time stamp 1 to be described later is accessory to status information (cache status information 1) cached in the server PC 301.

The threshold X is equivalent to the expiration date of status information of the MFP 100 that is cached in the disk apparatus 202 of the server PC 300. For example, the server PC 300 sets the threshold X to be 30 sec. When the value of the threshold X is large, cached status information is selected at high probability as a transmission target to the client PC 200. This reduces the burden of inquiring the status of the MFP by the server PCs 300 and 301, but may decrease the accuracy of status information. In contrast, when the value of the threshold X is small, cached status information is selected at low probability as a transmission target to the client PC 200. This increases the burden of inquiring the status of the MFP by the server PCs 300 and 301, but increases the accuracy of status information. The value of the threshold X suffices to be set appropriately in consideration of system conditions such as the processing capability of the whole system.

Upon the transmission processing by the server PC 300 in step S505, the client PC 200 receives the status information and time stamp 2 from the server PC 300 (step S506). The client PC 200 displays the received status information and time stamp 2 on the user interface of the application 400 (step S507).

Figure 8:
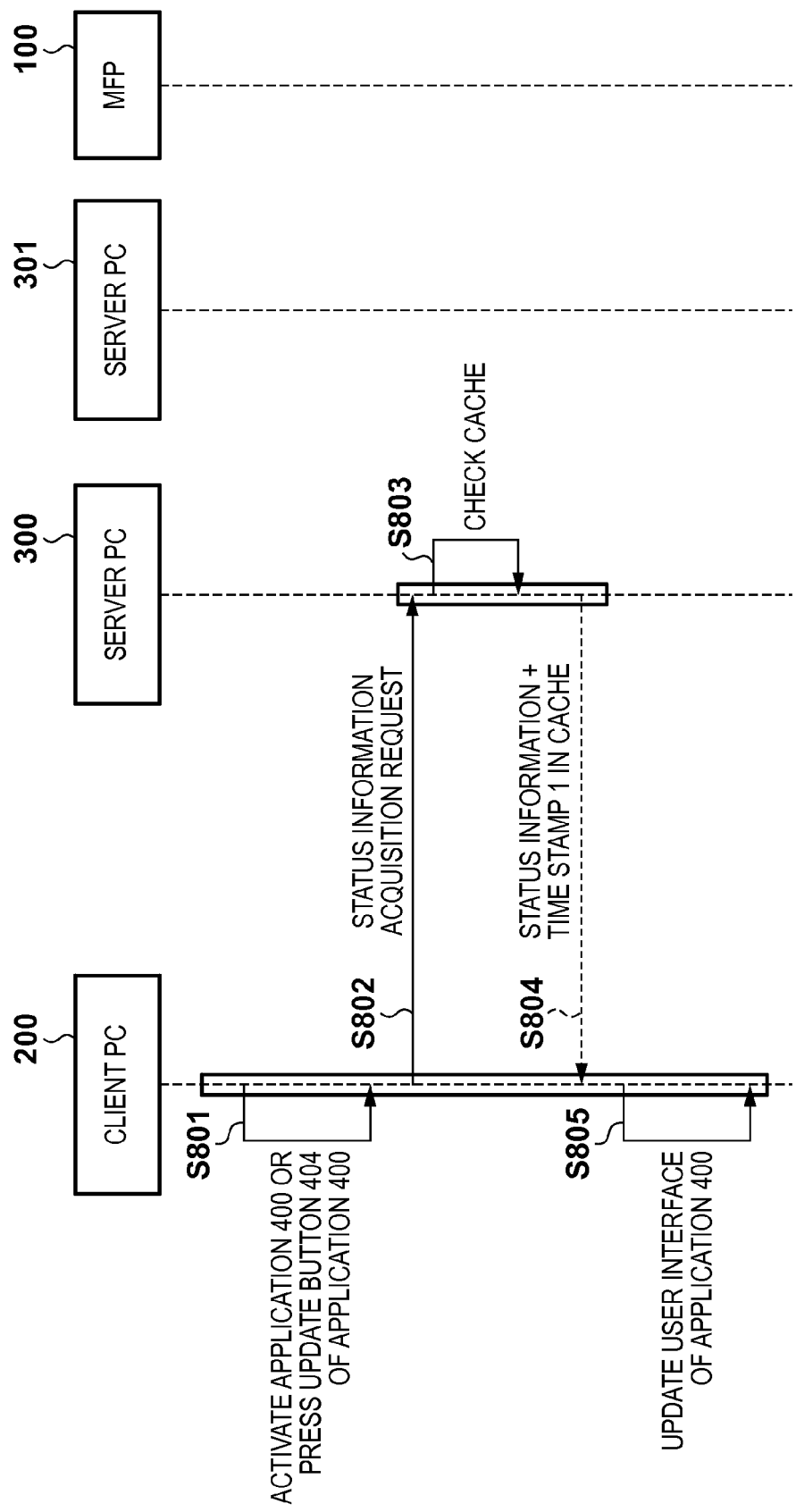
FIG. 8 is a sequence chart showing an example of status acquisition processing.

FIG. 8 is a sequence chart when the difference between time stamp 2 and the current time T when the client PC 200 inquired status information of the server PC 300 is smaller than the threshold X (YES in step S504).

The user activates the application 400 or presses the update button 404 of the application 400 on the client PC 200 (step S801). In response to this, the client PC 200 transmits a status information acquisition request for the MFP 100 to the server PC 300 (step S802).

Upon receiving the status information acquisition request for the MFP 100 from the client PC 200, the server PC 300 acquires cache status information 2 of the MFP 100 (step S803). Then, the server PC 300 transmits cache status information 2 and time stamp 2 to the client PC 200 (step S804).

By using the received status information, the client PC 200 updates information on the user interface of the application 400 (step S805).

Referring back to the description of FIGS. 5A and 5B, the server PC 300 checks time stamp 2 of cache status information 2 of the MFP 100 (step S504). If the acquisition of cache status information 2 has failed or the difference between time stamp 2 of cache status information 2 and the current time T is equal to or larger than the threshold X (NO in step S504), the server PC 300 transmits the status information acquisition request for the MFP 100 to the server PC 301 (step S508).

The server PC 301 receives the status information acquisition request for the MFP 100 from the server PC 300 (step S509). The server PC 301 acquires status information (cache status information 1) of the MFP 100 that is cached in the disk apparatus 202 (step S510). In the disk apparatus 202 of the server PC 301, status information is cached for each MFP. The server PC 301 checks time stamp 1 accessory to cache status information 1 of the MFP 100. By this check, the server PC 301 determines whether the acquisition of cache status information 1 of the MFP 100 has succeeded and whether the difference between time stamp 1 and the current time T is smaller than a threshold Z (step S511). That is, time stamp 1 and the current time T are compared. If the difference is smaller than the threshold Z as a result of the comparison (YES in step S511), the server PC 301 transmits, as a response to the server PC 300, cache status information 1 and time stamp 1 of the MFP 100 (step S512).

Note that the threshold Z is set to be larger than the threshold X and be a minimum time interval at which the user wants to update status information he wants. When the value of the threshold Z is large, cache status information 1 is selected as a transmission target at high probability. This reduces the burden of communication between the server PC 301 and the MFP 100, but may decrease the accuracy of status information. In contrast, when the value of the threshold Z is small, cache status information 1 is selected as a transmission target at low probability. This increases the burden of communication between the server PC 301 and the MFP 100, but increases the accuracy of status information. For example, the threshold Z is set to be 60 min so that status information is updated at least once in 60 min. The threshold Z may be set to be an infinitely large value. The value of the threshold Z suffices to be set appropriately in consideration of system conditions such as the processing capability of the whole system.

The server PC 300 receives status information and time stamp 1 from the server PC 301 (step S513). The server PC 300 updates cache status information 2 by the received status information and time stamp 1, and updates time stamp 2 by the time of reception (current time) (step S514). After that, the process advances to step S505 and subsequent steps. Note that when cache status information 2 is updated in step S514, cache status information 2 and time stamp 1 serve as transmission targets to the client PC 200 in step S505.

The server PC 301 transmits cache status information 1 and time stamp 1 of the MFP 100 as a response, and checks time stamp 1 accessory to cache status information 1 of the MFP 100 (step S512). By this check, the server PC 301 determines whether the acquisition of cache status information 1 of the MFP 100 has succeeded and whether the difference between time stamp 1 and the current time T is smaller than a threshold Y (step S515). That is, time stamp 1 and the current time T are compared. If the difference is smaller than the threshold Y as a result of the comparison (YES in step S515), the process ends. If the difference is equal to or larger than the threshold Y (NO in step S515), the server PC 301 executes status information asynchronous acquisition processing for the MFP 100 (step S516). The status information asynchronous acquisition processing is processing of inquiring the status of the MFP 100. Status information obtained by this inquiry is not used for a response to the status information acquisition request from the server PC 300, but is used to update cache status information 1 and time stamp 1 in the server PC 301.

More specifically, for example, when the difference between the current time and time stamp 1 is equal to or larger than the threshold Y and is smaller than the threshold Z, the transmission target to the server PC 300 is cache status information 1 already stored in the disk apparatus 202 of the server PC 301. Along with the transmission, cache status information 1 and time stamp 1 are updated by the latest information.

Note that the threshold Y is set to be a shortest time during which the MFP 100 can update status information and send it back to the server PC 301, and be a value smaller than the threshold Z. In other words, the threshold Y is set to be a shortest time between the start and completion of update of an inquired status in the MFP serving as a peripheral apparatus. For example, when status information is ink replacement confirmation information, the threshold Y is set to be a shortest time (for example, 120 sec) until the replacement of ink starts and ends in the MFP 100 and the MFP 100 changes to an idle state. That is, the time of the threshold Y is necessary to change from the ink absent state to the ink present state.

For example, when the server PC 301 inquires the status of the MFP 100 at an interval shorter than the threshold Y, the difference between the current time and time stamp 1 becomes smaller than the time for ink replacement. Even if the status is inquired at an interval shorter than the threshold Y, the status does not change from the ink absent state to the ink present state, and the amount of communication for the inquiry may be wasted.

To prevent this, the threshold Y is set to be the time (for example, 120 sec) for ink replacement. Hence, cache status information 1 can be updated from the ink absent state to the ink present state by a proper communication amount. The threshold Y may be set to be changeable depending on the type of status information inquired by the client PC 200.

As an example of status information, ink replacement confirmation information has been described. However, the status information is not limited to this and may be status information of another printing agent such as toner or thermal transfer agent. When attention is paid to the printing agent, the threshold Y can be set to be a shortest time between the start and completion of the preparation of the printing agent mounted in the MFP 100.

Figure 9:
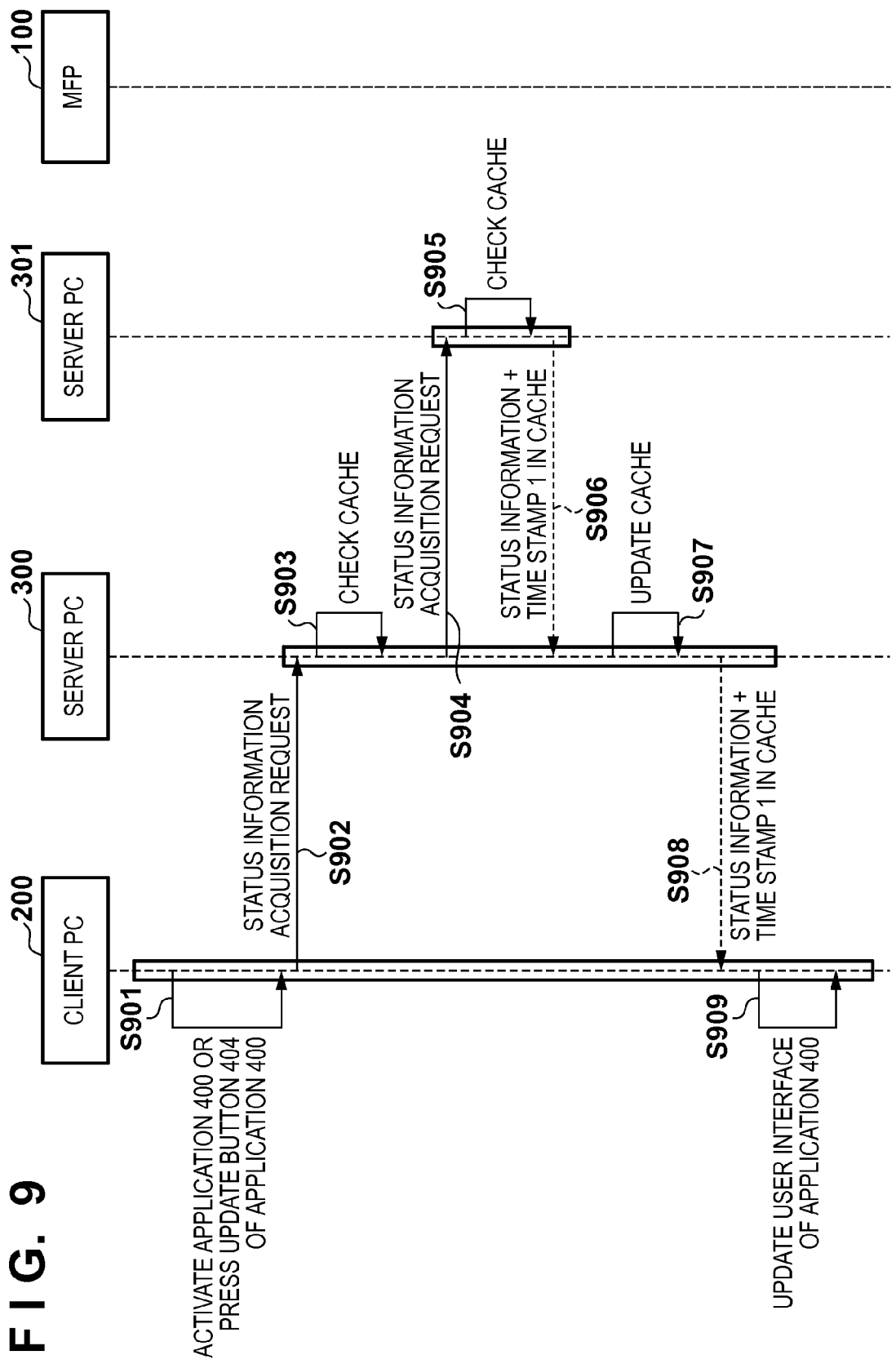
FIG. 9 is a sequence chart showing an example of the status acquisition processing.

FIG. 9 is a sequence chart when the difference between time stamp 1 and the current time T when the server PC 300 inquired status information of the server PC 301 is smaller than the threshold Y (YES in step S515). Since the threshold Z is larger than the threshold Y, "YES" is obtained in the determination processing of step S511 at this time, and status information synchronous acquisition processing in step S517 is not performed. Details of the status information synchronous acquisition processing will be described later. By this processing, the server PC 301 acquires the latest status information in the MFP 100, and the latest status information serves as a transmission target to the server PC 300. In the example of FIG. 9, the latest status information is not acquired, and cache status information 2 already stored in the server PC 301 serves as a transmission target to the server PC 300.

The user activates the application 400 or presses the update button 404 of the application 400 on the client PC 200 (step S901). In response to this, the client PC 200 transmits a status information acquisition request for the MFP 100 to the server PC 300 (step S902).

Upon receiving the status information acquisition request for the MFP 100 from the client PC 200, the server PC 300 acquires cache status information 2 of the MFP 100 (step S903). Then, the server PC 300 transmits a status information acquisition request for the MFP 100 to the server PC 301 (step S904).

Upon receiving the status information acquisition request for the MFP 100 from the server PC 300, the server PC 301 acquires cache status information 1 of the MFP 100 (step S905). The server PC 301 transmits cache status information 1 and accessory time stamp 1 to the server PC 300 (step S906).

The server PC 300 updates cache status information 2 by the status information and time stamp 1 received from the server PC 301, and updates time stamp 2 by the time of reception (current time) (step S907). Then, the server PC 300 transmits updated cache status information 2 and time stamp 1 to the client PC 200 (step S908).

By using the status information received from the server PC 300, the client PC 200 updates information on the user interface of the application 400 (step S909). In the example of FIG. 9, the difference between the current time and time stamp 1 is smaller than the threshold Y, so status information asynchronous acquisition processing in step S516 is not executed.

Figure 6:
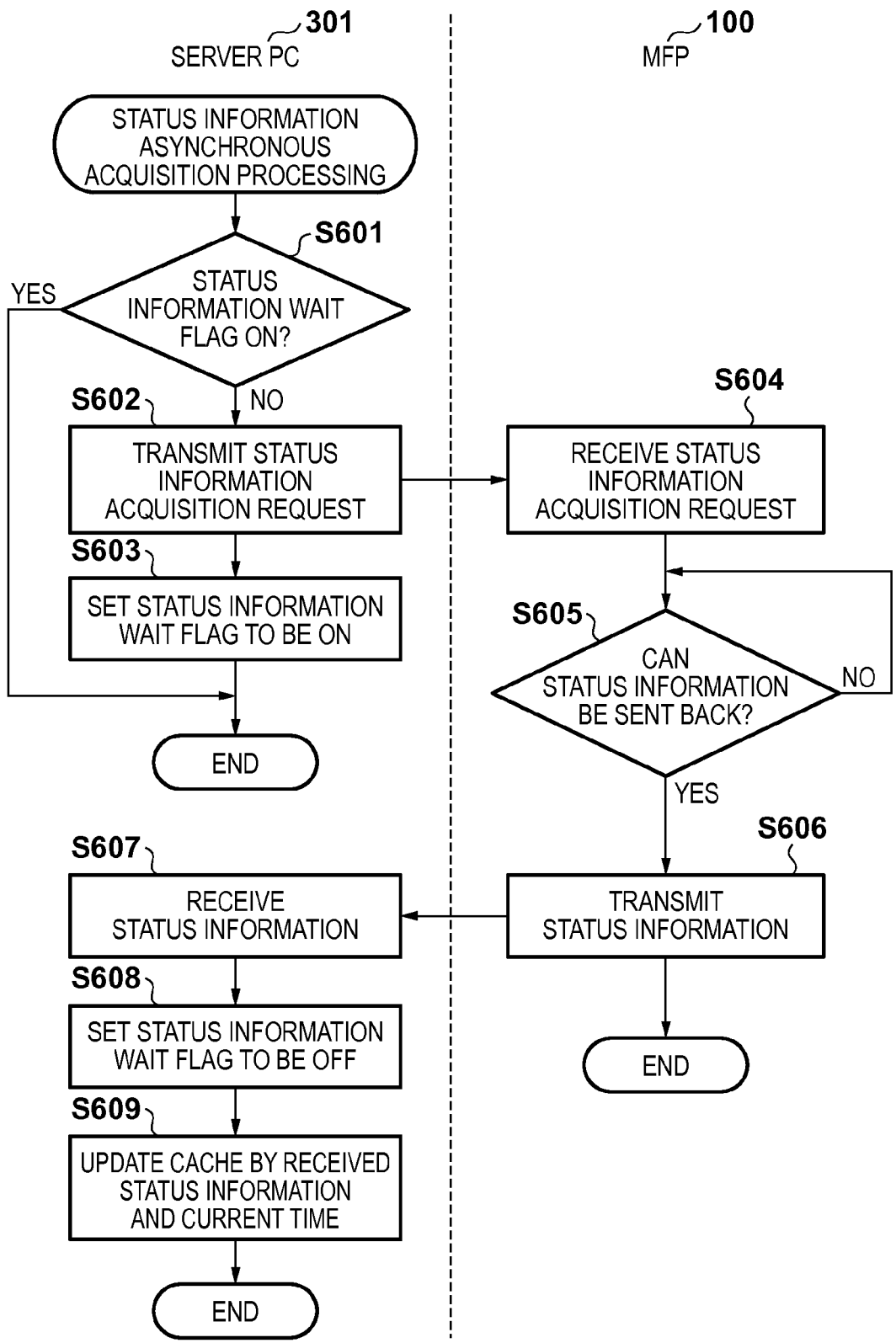
FIG. 6 is a flowchart showing an operation of asynchronously acquiring status information from the MFP by the server PC.

FIG. 6 is a flowchart showing details of the status information asynchronous acquisition processing (step S516) by the server PC 301.

First, the server PC 301 checks whether a status information wait flag held in the disk apparatus 202 is ON (step S601). Here, the server PC 301 holds the status information wait flag for each MFP. If the status information wait flag is ON, this represents a state in which a status information acquisition request has already been transmitted to the MFP but the MFP has not sent back status information yet.

If the status information wait flag is ON (YES in step S601), the process ends. If the status information wait flag is not ON (NO in step S601), that is, is OFF, the server PC 301 transmits a status information acquisition request to the MFP 100 (step S602). Then, the server PC 301 sets the status information wait flag to be ON (step S603).

The MFP 100 receives the status information acquisition request from the server PC 301 (step S604). The MFP 100 determines whether status information can be sent back (step S605). For example, when the MFP 100 is performing any work such as printing, scanning, or ink tank replacement, it cannot send back status information to the server PC 301. Only after the MFP 100 ends the work and changes to an idle state, it can send back status information to the server PC 301. That is, when status information of the MFP as a peripheral apparatus is being updated, it is determined that the status information cannot be sent back. When the update of status information of the MFP is completed, it is determined that the status information can be sent back.

If status information cannot be sent back (NO in step S605), the process waits until status information becomes able to be sent back. If status information can be sent back (YES in step S605), the MFP 100 transmits the status information to the server PC 301 (step S606).

The server PC 301 receives the status information from the MFP 100 (step S607). The server PC 301 sets the status information wait flag to be OFF (step S608). The server PC 301 updates cache status information 1 by the received status information, and updates time stamp 1 by the time of reception (current time) (step S609).

Figure 10:
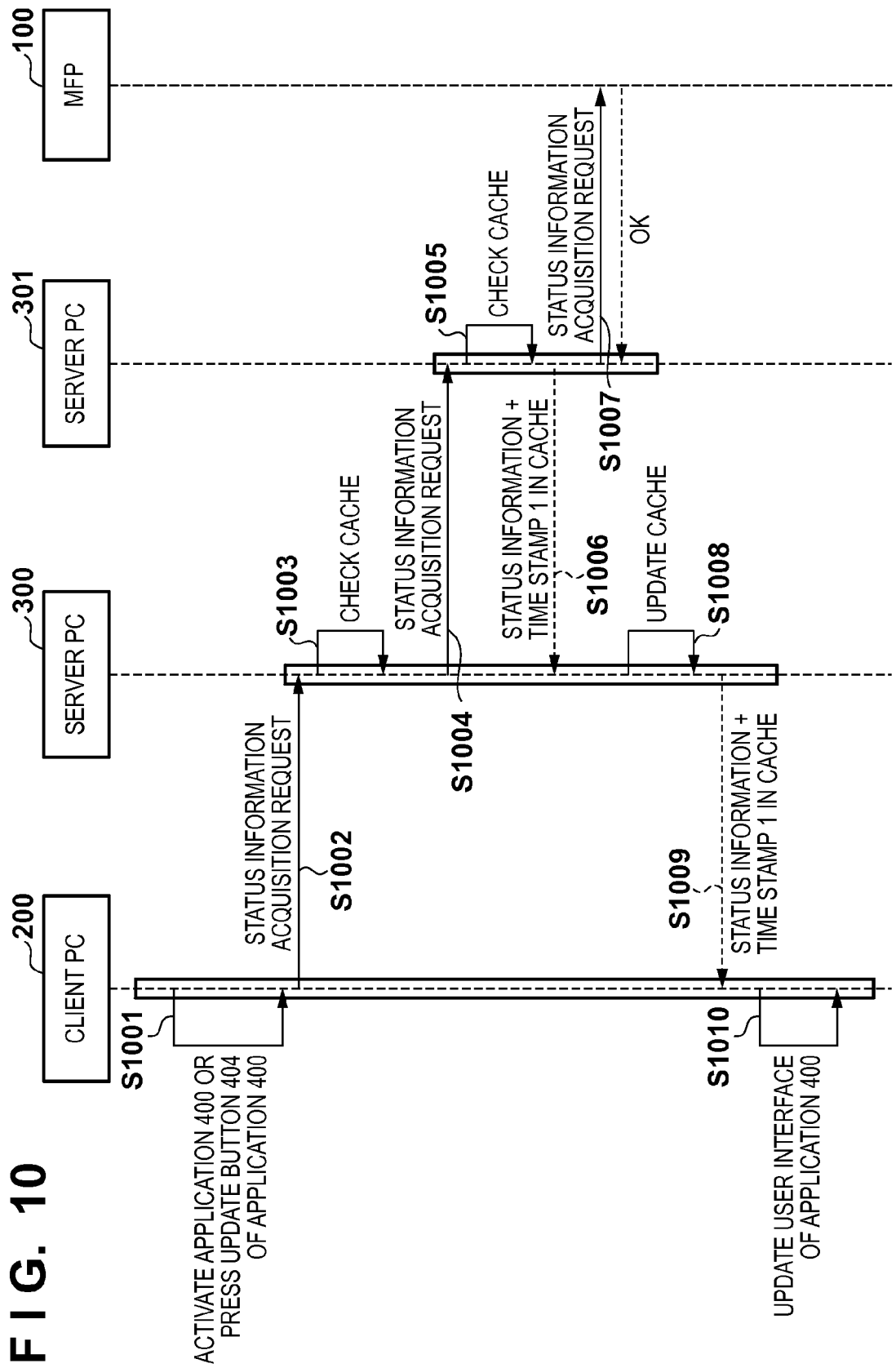
FIG. 10 is a sequence chart showing an example of the status acquisition processing.

FIG. 10 is a sequence chart when the difference between time stamp 1 and the current time T when the server PC 300 inquired status information of the server PC 301 is smaller than the threshold Z and is equal to or larger than the threshold Y (YES in step S511 and NO in step S515), or when the server PC 301 fails in acquiring cache status information 1. At this time, "YES" is obtained in the determination processing of step S511, and the status information synchronous acquisition processing in step S517 is not performed. Cache status information 2 already stored in the server PC 301 serves as a transmission target to the server PC 300. However, "NO" is obtained in the determination of step S515, and the status information asynchronous acquisition processing in step S516 is performed. Therefore, update of cache status information 1 in the server PC 301 is performed.

Steps S1001, S1002, S1003, S1004, and S1005 are the same processes as steps S901, S902, S903, S904, and S905 in FIG. 9, and a description thereof will not be repeated.

The server PC 301 transmits cache status information 1 and accessory time stamp 1 to the server PC 300 (step S1006). Thereafter, the server PC 301 executes the status information asynchronous acquisition processing described with reference to step S516 and FIG. 6. In this case, the server PC 301 transmits a status information acquisition request to the MFP 100 (step S1007). The server PC 301 ends the process without waiting for a status information response from the MFP 100.

Steps S1008, S1009, and S1010 are the same processes as steps S907, S908, and S909 in FIG. 9, and a description thereof will not be repeated.

Referring back to the description of FIG. 5, the server PC 301 checks time stamp 1 of cache status information 1 of the MFP 100 in step S511. If the acquisition of cache status information 1 has failed or the difference between time stamp 1 of cache status information 1 and the current time T is equal to or larger than the threshold Z (NO in step S511), the server PC 301 executes status information synchronous acquisition processing for the MFP 100 (step S517). In the status information synchronous acquisition processing, the server PC 301 requests status information of the MFP 100, acquires the latest status information in the MFP 100, and sets the latest status information as a transmission target to the server PC 300. That is, if the difference is equal to or larger than the threshold Z, the server PC 301 determines to transmit the latest status information, and executes status information synchronous acquisition processing.

The server PC 301 updates cache status information 1 by the status information acquired in step S517, and updates time stamp 1 by the time of acquisition (current time) (step S518). After that, the server PC 301 advances to step S512.

Figure 7:
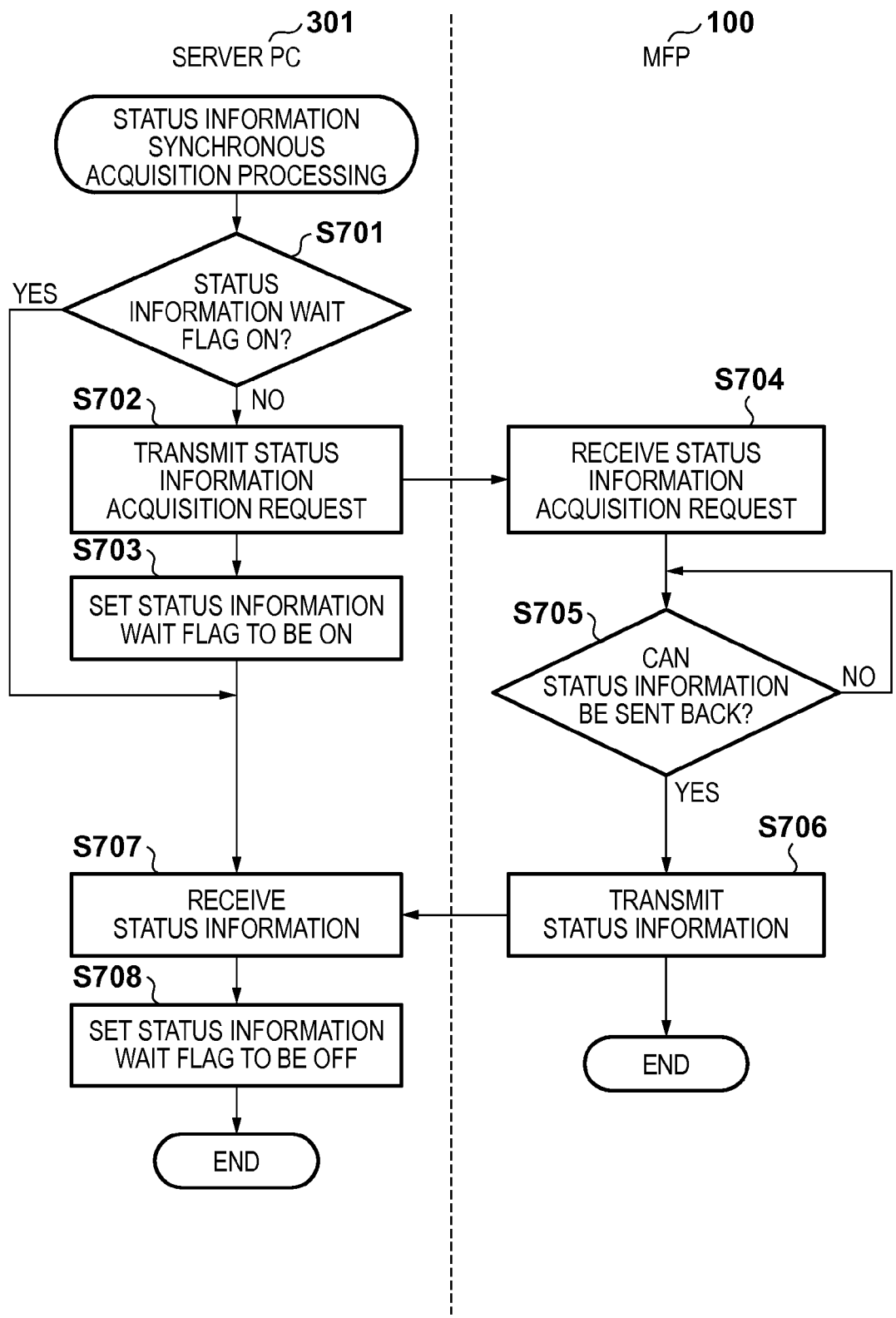
FIG. 7 is a flowchart showing an operation of synchronously acquiring status information from the MFP by the server PC.

FIG. 7 is a flowchart showing details of the status information synchronous acquisition processing (step S517).

First, the server PC 301 determines whether the status information wait flag held in the disk apparatus 202 is ON (step S701). Here, the server PC 301 holds the status information wait flag for each MFP. If the status information wait flag is ON, this represents a state in which a status information acquisition request has already been transmitted to the MFP but the MFP has not sent back status information yet.

If the status information wait flag is ON (YES in step S701), the server PC 301 waits for transmission of status information from the MFP 100 (step S707). If the status information wait flag is not ON (NO in step S701), that is, is OFF, the server PC 301 transmits a status information acquisition request to the MFP 100 (step S702). The server PC 301 sets the status information wait flag to be ON (step S703). Then, the server PC 301 waits for transmission of status information from the MFP 100 (step S707).

Note that the server PC 301 may transmit a status information wait notification to the client PC 200 immediately before waiting for transmission of status information from the MFP 100 in step S707. Upon receiving a status information wait notification from the server PC 301, the client PC 200 uses asynchronous communication, for example, Ajax, and can perform control not to disable the operation of the application 400 by the user until status information is sent back.

Subsequent steps S704, S705, and S706 are the same processes as steps S604, S605, and S606 in FIG. 6, and a description thereof will not be repeated. Also, steps S707 and S708 are the same processes as steps S607, S608, and S609 in FIG. 6, and a description thereof will not be repeated.

FIG. 11 is a sequence chart when the difference between time stamp 1 and the current time T when the server PC 300 inquired status information of the server PC 301 is equal to or larger than the threshold Z (NO in step S511), or when the server PC 301 fails in acquiring cache status information 1.

Steps S1101, S1102, S1103, S1104, S1105, and S1106 are the same processes as steps S1001, S1002, S1003, S1004, S1005, and S1006 in FIG. 10, and a description thereof will not be repeated.

After step S1106, the server PC 301 transmits a status information wait notification to the client PC 200 (step S1113). By using asynchronous communication, for example, Ajax, the client PC 200 performs control not to disable the operation of the application 400 by the user until status information is sent back.

The MFP 100 receives a status information acquisition request from the server PC 301 (step S1106). If status information becomes able to be sent back, the MFP 100 transmits the status information to the server PC 301 (step S1107).

The server PC 301 updates cache status information 1 by the status information received from the MFP 100, and updates time stamp 1 by the time of reception (step S1108). The server PC 301 transmits updated cache status information 1 and time stamp 1 to the server PC 300 (step S1109).

Subsequent steps S1110, S1111, and S1112 are the same processes as steps S1008, S1009, and S1010 in FIG. 10, and a description thereof will not be repeated.

In FIG. 12A is a table which manages the threshold X held in the server PC 300. An appropriate value can be individually decided and held in accordance with the type of MFP and the type of status to be inquired. In FIG. 12B is a table which manages the thresholds Y and Z held in the server PC 301. Appropriate values can be decided and individually held in accordance with the type of MFP and the type of status to be inquired.

Note that the threshold is not always decided in accordance with the type of status, but may also be decided in accordance with the type of device whose status is acquired. For example, for a device whose status is frequently changed, proper status information can be acquired by setting the aforementioned threshold to be relatively small. The "type of device" may be the difference in device such as a camera or printer, or the difference in model of a printer. Further, a threshold corresponding to a combination of the "type of device" and "type of status" may be set.

As described above, according to the embodiment, the server PC caches a status acquired from the MFP, together with the acquisition date & time, and sets the threshold regarding update of the status to be a shortest time necessary to update a status of interest. Upon receiving a status inquiry from the client PC, the server PC compares the reception time with the threshold. If the reception time is earlier than the threshold, the server PC sends back status information in the cache. If the reception time is equal to or later than the threshold, the server PC sends back the status in the cache and then requests the MFP to update the status information. As described in regard to the thresholds X and Z, if the possibility that the status is changed is low (for example, the time necessary for ink replacement has not elapsed after the previous inquiry time), information cached in the server PC is transmitted to the client PC. Then, the client PC displays the status information cached in the server PC. If the status information is highly likely to have been updated, the server PC inquires the status information of the peripheral apparatus.

As described in regard to the threshold Y, even when information cached in the server PC is transmitted to the client PC, if a certain length of time has elapsed till the status information request time after the time of the time stamp, the cached status information is updated. When transmitting cached status information next time upon receiving a status information request, the updated status information can be transmitted.

In the above-described embodiment, if it is determined in step S515 that no predetermined time has elapsed till the status information request time after the time of the time stamp (YES in step S515), the cached status information and time stamp are not updated. More specifically, the cached status information is not updated unless a status information request is newly input after the lapse of the time corresponding to the threshold Y from the time stamp. However, the present invention is not limited to this. For example, even if the request is not newly input, the update may be performed automatically after the lapse of the time corresponding to the threshold Y from the time stamp. Hence, the cached status information can be updated by the changed status information. Also, no status information need be acquired before the lapse of the time corresponding to the threshold Y. Thus, when the possibility at which the status has changed is low, it can be prevented to newly acquire status information.

This can suppress wasteful communication between apparatuses, and display almost the latest status information on the client PC. By caching status information in the server PC, the status information can be quickly displayed on the client PC.

In the above-described embodiment, two server apparatuses, that is, the server PCs 300 and 301 perform processing in cooperation. However, the present invention is not limited to this, and one server apparatus having the functions of these two server apparatuses may implement processing according to the embodiment. Alternatively, three or more server apparatuses may implement processing according to the embodiment by executing the processes of the server PCs 300 and 301 by a plurality of server apparatuses.

Further, the above-described embodiment has explained an example in which the server PC caches, acquires, and transmits status information. However, the present invention is not limited to this, and the client PC may perform these processes. More specifically, the client PC stores (stores and controls) status information of a device such as a printer in the memory together with time information (time stamp) when the status information was acquired. The client PC compares the time of the time stamp with the time when a status display instruction was received. If the difference is smaller than the threshold, the client PC displays the cached status information. If the difference is equal to or larger than the threshold, the client PC acquires status information from the device.

The above-described embodiment has exemplified transmission processing to the client PC as an example of status information output processing by the server PC. However, the present invention is not limited to this, and status information may be transmitted to a display device to display it, or status information may be transmitted to a printing apparatus to print it.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-096648, filed May 1, 2013, which is hereby incorporated by reference herein in its entirety.

What is claimed is:

1. A system comprising:
   an acquisition unit configured to acquire, from a device which performs predetermined processing, status information representing a status of the device;
   a storage control unit configured to store in a memory the status information acquired by the acquisition unit; and
   an outputting unit configured to output the status information in response to an input of a request to output the status information of the device, wherein
   the acquisition unit does not newly acquire status information from the device until a first time elapses, and
   the outputting unit outputs the status information stored in the memory before the input of the request when the request is input before an elapse of the first time from a time corresponding to acquisition of the status information stored in the memory by the storage control unit, in accordance with the request, and
   the acquisition unit newly acquires status information from the device, and
   the outputting unit outputs the status information stored in the memory before the input of the request when the request is input after the elapse of the first time, in accordance with the request.

2. The system according to claim 1, wherein the acquisition unit newly acquires status information from the device in accordance with a new request when the new request is input after the elapse of the first time and after the acquisition of the status information.

3. The system according to claim 1, wherein the acquisition unit newly acquires status information from the device after the elapse of the first time in accordance with the request when the request is input before the elapse of the first time and after the acquisition of the status information, even if a new request is not input.

4. The system according to claim 1, wherein the acquisition unit newly acquires status information from the device, and the outputting unit outputs the newly acquired status information in accordance with the request when the request is input after an elapse of a second time longer than the first time and after the acquisition of the status information stored in the memory.

5. The system according to claim 1, wherein the storage control unit stores a time corresponding to the acquisition of the status information stored in the memory together with the status information acquired by the acquisition unit, and the acquisition unit performs the acquisition based on a difference between the stored time and time corresponding to the request.

6. The system according to claim 5, wherein the outputting unit outputs the status information and information representing the time corresponding to the acquisition of the status information.

7. The system according to claim 1, wherein the outputting unit outputs the status information to an external apparatus for displaying the status information on a display device.

8. The system according to claim 1, wherein the outputting unit receives the request from an external apparatus which is connected to the system and is different from the device, and outputs the status information to the external apparatus.

9. The system according to claim 8, wherein the system is connected to a plurality of external apparatuses via a network and receives the request from each of the plurality of external apparatuses.

10. The system according to claim 9, wherein the system is connected to a plurality of devices via a network, and the acquisition unit acquires status information from a device corresponding to the request among the plurality of devices.

11. The system according to claim 1, wherein the device includes a printer, and the predetermined processing includes a process of printing an image.

12. The system according to claim 11, wherein the acquisition unit acquires, as the status information, information about a remaining amount of printing agent for printing an image by the printer.

13. The system according to claim 1, wherein the system includes one or more servers connectable to the device via an Internet connection.

14. The system according to claim 13, wherein
   the one or more servers include a first server which includes the outputting unit and a second server which includes the acquisition unit,
   the first server stores first status information acquired from the second server, and the second server stores second status information acquired by the acquisition unit from the device,
   the first server outputs the first status information by the outputting unit when the request is input to the first server before an elapse of a third time shorter than the first time after the acquisition of the first status information, and
   the first server acquires the second status information from the second server and outputs the second status information by the outputting unit when the request is input to the first server after the elapse of the third time.

15. The system according to claim 1, wherein the first time has a value corresponding to a type of status corresponding to the request.

16. The system according to claim 1, wherein the first time has a value corresponding to a type of device.

17. A system comprising:
   one or more servers connectable to a device which performs predetermined processing; and
   a communication terminal communicable with the one or more servers, wherein
   the communication terminal includes a request unit configured to request, of the one or more servers, status information representing a status of the device, and
   the one or more servers include an acquisition unit configured to acquire the status information from the device, a storage control unit configured to store in a memory the status information acquired by the acquisition unit, and an outputting unit configured to output, to the communication terminal, the status information in response to an input of a request by the request unit of the communication terminal, wherein the acquisition unit does not newly acquire status information from the device until a first time elapses, and the outputting unit outputs the status information stored in the memory before the input of the request when the request is input before an elapse of the first time from a time corresponding to acquisition of the status information stored in the memory by the storage control unit, in accordance with the request, and the acquisition unit newly acquires status information from the device and the outputting unit outputs to the communication terminal the status information stored in the memory before the input of the request when the request is input after the elapse of the first time, in accordance with the request.

18. A method comprising:

acquiring from a device which performs predetermined processing status information representing a status of the device; and storing the acquired status information in a memory, wherein not newly acquiring status information from the device until a first time elapses and outputting the status information stored in the memory before input of the request when status information of the device is requested before an elapse of the first time from a time corresponding to acquisition of the status information stored in the memory, in accordance with the request, and newly acquiring status information from the device and outputting the status information stored in the memory before input of the request when the status information of the device is requested after the elapse of the first time, in accordance with the request.

19. A system comprising:

an acquisition unit configured to acquire, from a device which performs predetermined processing, status information representing a status of the device;

a storage control unit configured to store in a memory the status information acquired by the acquisition unit; and an outputting unit configured to output the status information in response to input of a request to output the status information of the device, wherein the acquisition unit newly acquires status information from the device, and the outputting unit outputs the status information stored in the memory before the input of the request when the request is input before an elapse of a second time longer than a first time from a time corresponding to acquisition of the status information stored in the memory by the storage control unit, in accordance with the request, and the acquisition unit newly acquires status information, and the outputting unit outputs the newly acquired status information when the request is input after the elapse of the second time, in accordance with the request.

20. The system according to claim 19, wherein the storage control unit stores a time corresponding to the acquisition of the status information in the memory together with the status information acquired by the acquisition unit, and the acquisition unit performs the acquisition based on a difference between the stored time and time corresponding to the request.

21. The system according to claim 20, wherein the outputting unit outputs the status information and information representing the time corresponding to the acquisition of the status information.

22. The system according to claim 19, wherein the outputting unit outputs the status information to an external apparatus for displaying the status information on a display device.

23. The system according to claim 19, wherein the outputting unit receives the request from an external apparatus, which is connected to the system and is different from the device, and outputs the status information to the external apparatus.

24. The system according to claim 23, wherein the system can be connected to a plurality of external apparatuses via a network and receives the request from each of the plurality of external apparatuses.

25. The system according to claim 24, wherein the system is connected to a plurality of devices via a network, and the acquisition unit acquires status information from a device corresponding to the request among the plurality of devices.

26. The system according to claim 19, wherein the device includes a printer, and the predetermined processing includes a process of printing an image.

27. The system according to claim 26, wherein the acquisition unit acquires information about a remaining amount of printing agent for printing an image by the printer as the status information.

28. The system according to claim 19, wherein the system includes one or more servers connectable to the device via an Internet connection.

29. The system according to claim 28, wherein the one or more servers include a first server which includes the outputting unit, and a second server which includes the acquisition unit, the first server stores first status information acquired from the second server, and the second server stores second status information acquired by the acquisition unit from the device, the first server outputs the first status information by the outputting unit when the request is input to the first server before an elapse of a third time shorter than the second time after the acquisition of the first status information, and the first server acquires the second status information from the second server, and outputs the second status information by the outputting unit when the request is input to the first server after an elapse of the third time.

30. A system comprising:

one or more servers connectable to a device which performs predetermined processing, and a communication terminal communicable with the one or more servers, wherein the communication terminal includes a request unit configured to request, of the one or more servers, status information representing a status of the device, and the one or more servers include an acquisition unit configured to acquire the status information from the device, a storage control unit configured to store in a memory the status information acquired by the acquisition unit, and an outputting unit configured to output, to the communication terminal, the status information in response to an input of a request by the request unit of the communication terminal, wherein the acquisition unit newly acquires status information from the device, and the outputting unit outputs the status information stored in the memory before the input of the request when the request is input before an elapse of a second time greater than a first time from a time corresponding to acquisition of the status information stored in the memory by the storage control unit, in accordance with the request, and the acquisition unit newly acquires status information, and the outputting unit outputs the newly acquired status information when the request is input after the elapse of the second time, in accordance with the request.

* * * * *